(12) United States Patent  
Kassem et al.

(10) Patent No.: US 11,905,807 B2  
(45) Date of Patent: Feb. 20, 2024

(54) WORKFLOW TO MODEL AND CONDITION WATER DISTRIBUTION IN A HYDROCARBON RESERVOIR

(71) Applicant: SAUDI ARABIAN OIL COMPANY, Dhahran (SA)

(72) Inventors: Ahmed Moustafa Abdel Wahab M. Kassem, London (GB); Nawaf Abdulrahman A Alghamdi, Dhahran (SA); Badr Saeed Badghaish, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 303 days.

(21) Appl. No.: 17/363,706

(22) Filed: Jun. 30, 2021

(65) Prior Publication Data

US 2023/0003109 A1 Jan. 5, 2023

(51) Int. Cl.  
*E21B 43/20* (2006.01)  
*E21B 43/267* (2006.01)  
*G01V 9/02* (2006.01)

(52) U.S. Cl.  
CPC ............ *E21B 43/20* (2013.01); *E21B 43/267* (2013.01); *G01V 9/02* (2013.01)

(58) Field of Classification Search  
CPC .............................. E21B 43/20; E21B 2200/20  
See application file for complete search history.

(56) References Cited

U.S. PATENT DOCUMENTS

| | | | |
|---|---|---|---|
| 8,521,435 B2 * | 8/2013 | Minh | G01V 11/00 708/200 |
| 9,671,525 B2 * | 6/2017 | Al-Ibrahim | G01V 3/32 |
| 11,561,215 B2 * | 1/2023 | Nie | G06F 30/20 |
| 2005/0149307 A1 | 7/2005 | Gurpinar et al. | |
| 2007/0219724 A1 | 9/2007 | Li et al. | |
| 2018/0031720 A1 | 2/2018 | Etiene Queiroz et al. | |
| 2018/0156932 A1 | 6/2018 | Sain | |
| 2020/0271801 A1 | 8/2020 | Kayum | |

(Continued)

FOREIGN PATENT DOCUMENTS

| | | | | |
|---|---|---|---|---|
| CA | 3058843 A1 * | 5/2020 | | E21B 41/0092 |
| CN | 102748014 A | 10/2012 | | |
| CN | 104183018 A | 12/2014 | | |

(Continued)

OTHER PUBLICATIONS

Alramahi et al. "Utilizing Capillary Pressure Measurements and Water Saturation Logs to Determine Reservoir Quality in a Giant Middle Eastern Carbonate Field," SPE-207625 (Year: 2021).*

(Continued)

*Primary Examiner* — John Fitzgerald  
(74) *Attorney, Agent, or Firm* — Osha Bergman Watanabe & Burton LLP

(57) ABSTRACT

A method includes determining a free water level in the reservoir, analyzing a free water pressure trend of the free water phase, determining a presence of anomalous pressures and salinities within the free water phase, determining whether gas down to models and water up to models fit the reservoir, determining a bi-modal pore throat distribution of the plurality of pores within the reservoir, and generating a difference map to model the water distribution in the reservoir.

20 Claims, 9 Drawing Sheets

(56) References Cited

U.S. PATENT DOCUMENTS

2021/0350052 A1\* 11/2021 AlQahtani .............. E21B 43/20

FOREIGN PATENT DOCUMENTS

| CN | 111008482 | A  | 4/2020  |
|----|-----------|----|---------|
| CN | 112012731 | A  | 12/2020 |
| EP | 1938281   | A2 | 7/2008  |
| IN | 104963657 | A  | 10/2015 |
| RU | 2731004   | C1 | 8/2020  |
| WO | 2020150540| A1 | 7/2020  |
| WO | 2020180303| A1 | 9/2020  |

OTHER PUBLICATIONS

Valentini et al. "Saturation Height Modelling: An Integrated Methodology to Define a Consistent Saturation Profile," 13th. Offshore Mediterranean Conference and Exhibition in Ravenna, Italy (Year: 2017).\*

Abdelaziz Lafi Khlaifat "Unconventional Gas is the Fuel of the Future for Jordan" International Journal of Petrochemistry and Research, Jun. 2017; ISSN: 2638-1974 (8 pages).

A. M. Ramdhan et.al. "Lateral Reservoir Drainage in some Indonesias Sedimentary Basins and Its Implication to Hydrodynamic Trapping" Indonesian Journal on Geoscience vol. 5 No. Apr. 1, 2018: 65-80 (16 pages).

Ahmed Taher, et.al. "Mishrif Diagenetic Trapping Potential in Western Onshore Abu Dhabi" SPE 137900; Jan. 2010 (16 pages).

David Sykes "Simulation of a Hydrodynamic Aquifer in the ACG Field, Azerbaijan" MSc and/or the DIC in Petroleum Engineering, Imperial Collage of London; Sep. 2014 (49 pages).

H. Dennis et al. "Hydrodynamic activity and tilted oil-water contacts in the North sea" Norwegian Petroleum Society Special Publications, vol. 9, pp. 171-185, Elsevier 2000 (15 pages).

Douglas J. Cant "Diagenetic Traps in Sandstone" AAPG, Bulletin, V.70, No. 2; Feb. 1986; p. 155-166 (6 pages).

J.C. Dolson "Understanding Seals, Pressures and Hydrodynamics" Springer International Publishing Switzerland 2016 (88 pages).

G. R. Gaafar et al. "Perched-water, the Concept and its Effects on Exploration and Field Development Plans in Sandstone and Carbonate Reservoirs" OTC-26653 Mar. 2016 (12 pages).

Julian N. Hulea "Fundamental Controls of "Perched" Water Contacts: From Recognition to Modelling" SPWLA 59th Annual Logging Symposium; Jun. 2-6, 2018 (10 pages).

Julian N. Hulea "Perched water contact: Understanding Fundemental Control" Petrophysics, vol. 60, No. 3; pp. 438-449; 15 Figures; 1 Table; Jun. 2019; DOI: 10.30632/PJV60N3-2019a7 (12 pages).

Jialiang Hu et al. "Hybrid Structural-Diagenetic Trap Related with Zagros Tectonic Movement in Eastern Abu Dhabi" SPE-183400-MS; Nov. 2016 (21 pages).

J. Wendebourg et al. "Hydrodynamics and hydrocarbon trapping: Concepts, pitfalls and insights from case studies" Marine and Petroleum Geology 96 (2018) 190-201, Elsevier (12 pages).

J. Dolson, et al. "Advances and Perspectives on Stratigraphic Trap Exploration-Making the Subtle Trap Obvious" oral presentation given at AAPG 2017 Middle East Region Geosciences Technology Workshop, Stratigraphic Traps of the Middle East, Muscat, Oman, Dec. 11-13, 2017 (67 pages).

John Dolson "Have We Overlooked the Role of Deep Basin Hydrodynamic Flow in Flushing and Titling Hydrocarbon Contacts in the Nile Delta and Gulf of Suez?" Oral presentation given at AAPG Geoscience Technology Workshop, Alexandria, Egypt, May 20-23, 2016 (55 pages).

J. Gao et al. "Different Methods of Modelling Tilted Free Water Levels and the Impact on the Field Production" SPE-175593-MS; Sep. 2015 (11 pages).

L. Zhuo et al. "Causes of hydrodynamic pressure distribution: A case of the 4th Pay in Zubair Formation, Rumaila Oilfield, Iraq" Petroleum Exploration and Development, vol. 40, Issue 6, Dec. 2013, ScienceDirect (6 pages).

M. A. Kindi et al. "Predicting Tilted Fluid Contacts: Case Study from a Carbonate Reservoir in NW Oman" Oral presentation given at AAPG GEO 2016, The 12th Middle East Geosciences Conference and Exhibition Mar. 7-10, 2016, Manama, Bahrain (20 pages).

P.R.A Wells "Hydrodynamic trapping in the Cretaceous Nahr Umr Lower Sand of the North Area, Offshore Qattar" Qattar General Petroleum Corp; Journal of Petroleum Technology; Mar. 1988 (8 pages).

Ralph W. Edie "The Inclined Oil-Water Contact at the Joarcam field" vol. 3, Journal of the Alberta Society of Petroleum Geologist; Jul. 1955 (5 pages).

Roberto Colin et al. "Perched Water Interpretation: Case Study in Offshore Egypt" 14th Offshore Mediterranean Conference and Exhibition in Ravenna, Italy; Mar. 2019 (13 pages).

J. Jauhari et al. "Hydrodynamic Trapping, Tilted Contacts and New opportunities in Mature Onshore Kutei Basin, East Kalimantan, Indonesia" AAPG International Conference and Exhibition; Oct. 2012 (12 pages).

Railsback's Petroleum Geoscience and Subsurface Geology "Diagenetic traps" Oct. 2011 (1 page).

S. Green et al. "The Importance of Recognizing Hydrodynamics for Understanding Reservoir Volumetrics, Field Development and Well Placement" oral presentation at AAPG 2014 Annual Convention and Exhibition; Apr. 2014 (19 pages).

Trond A. Rolfsvag and Thomas M. Danielsen, "Perched Water Static Model" SPE-180000-MS; Apr. 2016 (10 pages).

T. O'Sullivan et al. "Residual Hydrocarbons—A Trap for the Unwary" SPE 128013; Jan. 2010 (14 pages).

T. A. Dias et al. "Evidence for a Hydrodynamic Aquifer in the Lower Miocene Sands of the Mad Dog Field, Gulf of Mexico" AAPG Convention; Jan. 2009 (9 pages).

W. Yanzhong et al. "Mechanism of diagenetic trap formation in nearshore subaqueous fans on steep rift lacustrine basin slopesA case study from the Shahejie Formation on the north slope of the Minfeng Subsag, Bohai Basin, China" Pet.Sci.(2014)11:481-494; 2014 (14 pages).

Yunlai Yang and Khalid A. Mahmoud, "Theory and Approach for Mapping Hydrodynamic traps" IPTC 16810; Mar. 2013 (4 pages).

Yunlai Yang and Khalid A. Mahmoud, "Equation for defining hydrodynamic oil-water contact surface and an alternative approach, "structure surface transformation" for mapping hydrodynamic traps" Marine and Petroleum Geology 78 (2016) 701-711, Elsevier, Sep. 2016 (11 pages).

Y. Grosjean, et al. "Burial Hydrodynamics and Subtle Hydrocarbon Trap Evaluation from the Mahakam Delta to the South Caspian Sea" IPTC 13962; Dec. 2009 (12 pages).

Yuanlin Jiang "Techniques for Modeling Complex Reservoirs and Advanced Wells" Ph.D. Dissertation; Dec. 2007 (220 pages).

M. Lux et al. "Pressure and Migration Prediction by Hydrodynamic Modelling" 21st World Petroleum Congress, Moscow 2014 (17 pages).

H. Deng et al. "An Integrated Workflow for Reservoir Modeling and Flow Simulation of the Nikanassin Tight Gas Reservoir in the Western Canada Sedimentary Basin" SPE 146953; Oct. 2011 (26 pages).

H. Dennis et al. "Tilted Oil-Water Contacts: Modelling the Effects of Aquifer Heterogeneity" Petroleum Geology Conference Series 2005, p. 145-158 (14 pages).

\* cited by examiner

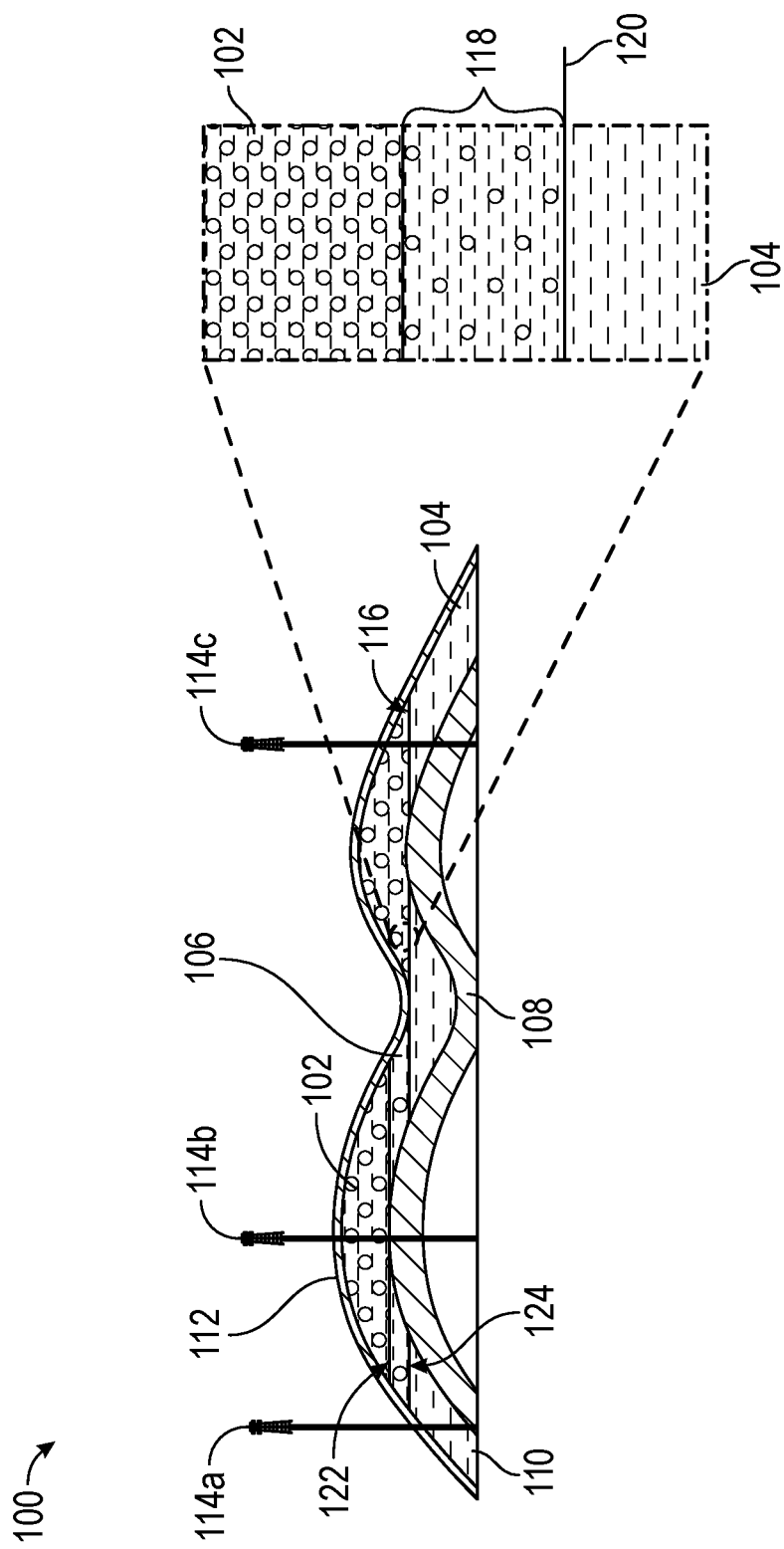

WORKFLOW TO MODEL AND CONDITION WATER DISTRIBUTION IN A HYDROCARBON RESERVOIR

BACKGROUND

Hydrocarbon fluids are often found in hydrocarbon reservoirs located in porous rock formations far below the earth's surface. Exploratory wells may be drilled into an unknown reservoir to obtain data regarding the subsurface structure. In order to optimize production from hydrocarbon reservoirs, various subsurface models may be created by interpreting the data obtained by the exploratory wells. Subsurface models represent the subsurface structure and may map the distribution of various subsurface fluids including water, oil, and gas.

There are various subsurface geological traps, such as structural and stratigraphic traps, that effect the distribution of water in a hydrocarbon reservoir. Being able to model water distribution and anticipate water breakthrough, particularly for complex hydrodynamic surfaces in gas wells, is beneficial to predicting and mitigating future production problems. As such, methods that help navigate the complex subsurface geological traps and types of subsurface water may be beneficial in producing reliable and accurate subsurface models.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure presents, in one or more embodiments, a method and a non-transitory computer readable medium storing instructions for modeling water distribution in a reservoir having a gas phase, a free water phase, and a plurality of pores. In general, and in one or more embodiments, the method includes determining a free water level in the reservoir, analyzing a free water pressure trend of the free water phase, determining a presence of anomalous pressures and salinities within the free water phase, determining whether gas down to models and water up to models fit the reservoir, determining a bi-modal pore throat distribution of the plurality of pores within the reservoir, and generating a difference map to model the water distribution in the reservoir.

In further embodiments, the non-transitory computer readable medium is executable by a computer processor and the instructions include functionality for determining a free water level in the reservoir, analyzing a free water pressure trend of the free water phase, determining a presence of anomalous pressures and salinities within the free water phase, determining whether gas down to models and water up to models fit the reservoir, determining a bi-modal pore throat distribution of the plurality of pores within the reservoir, and generating a difference map to model the water distribution in the reservoir.

Other aspects and advantages of the claimed subject matter will be apparent from the following description and the appended claims.

BRIEF DESCRIPTION OF DRAWINGS

FIG. 1 shows the structure and fluid interactions within an exemplary hydrocarbon reservoir.

DETAILED DESCRIPTION

Figure 2A:
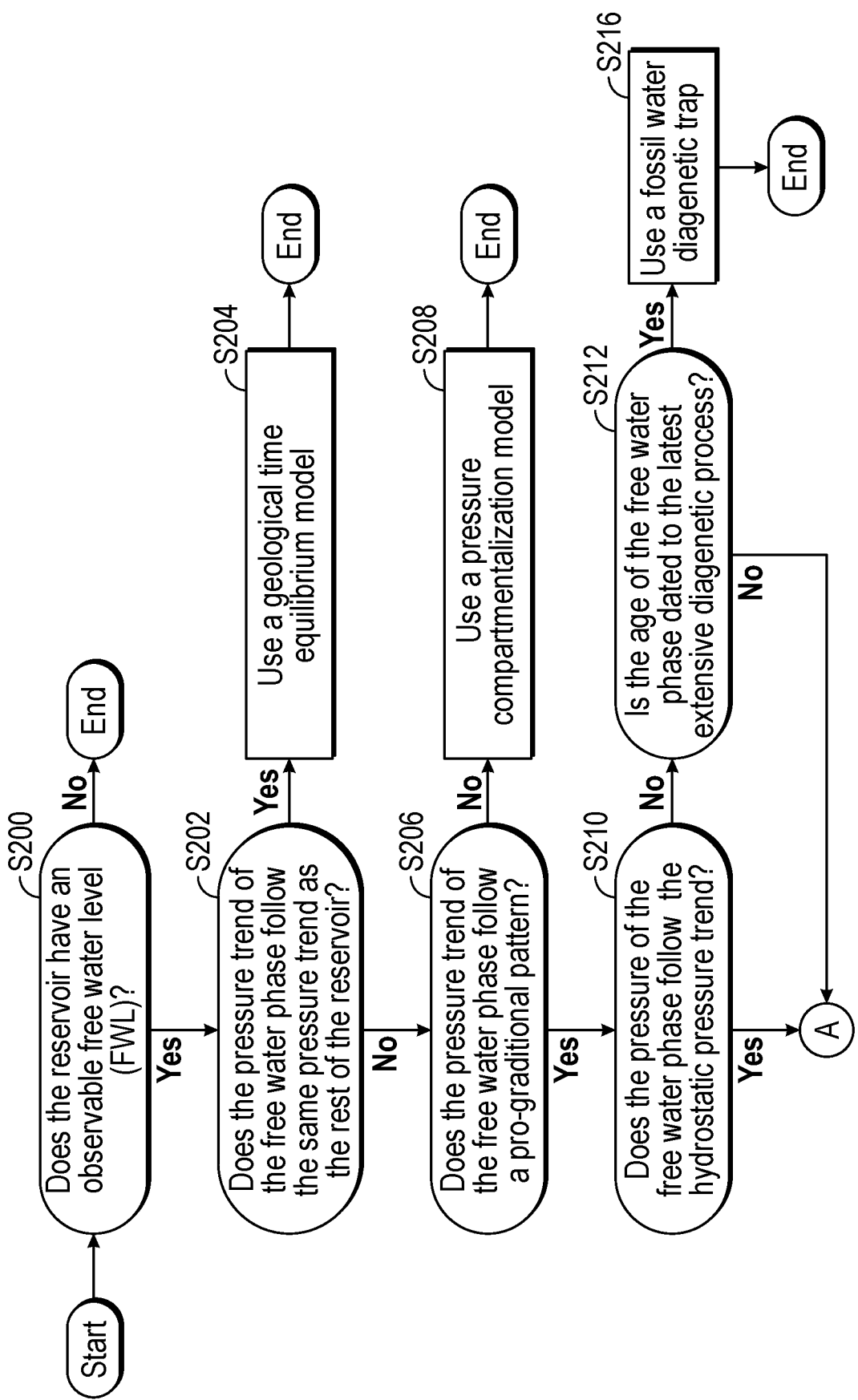
FIGS. 2a-2c show flowcharts in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate to a method for visualization of hydrodynamic trapping and a mapping tool to display water presence/distribution in a reservoir/basin. More specifically, embodiments disclosed herein are directed to a tool to assist reservoir modelling to identify water type and a workflow for analyzing water, communicate this analysis, and rank future wells for water presence according to a defined risk matrix. Embodiments disclosed herein have application on conventional and unconventional reservoirs and mixed reservoir types.

FIG. 1 shows the subsurface structure of and fluid interactions within an exemplary hydrocarbon reservoir (100). The depicted hydrocarbon reservoir (100) has three different subsurface fluids present: a gas phase (102), a free water phase (104), and an oil phase (106). Conventional hydrocarbon reservoirs (100), such as the one depicted in FIG. 1, have a source formation (108), a reservoir formation (110), and a cap formation (112). A source formation (108) is a formation rich in organic matter that, over time, is heated sufficiently to produce hydrocarbon fluids such as the gas phase (102) and oil phase (106).

The oil phase (106) and gas phase (102) migrate from the source formation (108) to a more porous and permeable rock called the reservoir formation (110). Due to the density difference between the gas phase (102) and the oil phase (106), the gas phase (102) migrates and settles above the oil phase (106) in the reservoir formation (110). The cap formation (112) is a formation with low permeability and/or porosity such that the oil phase (106) and the gas phase (102)

are prevented from migrating further and are "trapped" beneath the cap formation (112). In other embodiments, the source formation (108), the reservoir formation (110), and the cap formation (112) may be one and the same, these reservoirs are called unconventional hydrocarbon reservoirs.

Wells (114a-c) may be drilled into the hydrocarbon reservoir (100). Wells (114a-c) may be drilled into the formation for gathering data, producing the hydrocarbon fluids, and/or treating the formation. Each well (114a-c) may be an exploration well, a production well, or an injection well. As depicted in FIG. 1, a free water phase (104) may be present in the reservoir formation (110) alongside the gas phase (102) and the oil phase (106). In one or more embodiments, the free water phase (104) may have already been present in the reservoir formation (110) prior to the oil phase (106) and the gas phase (102) migrating from the source formation (108). In other embodiments, the free water phase (104) may have migrated from elsewhere, and/or the free water phase (104) may have been artificially introduced due to injection of water using the injection wells.

When an oil phase (106), gas phase (102), and free water phase (104) are all present in the reservoir formation (110), the phases migrate and settle due to density differences such that the free water phase (104) may be located beneath the oil phase (106) and the oil phase (106) may be located beneath the gas phase (102). Therefore, there are various "contacts" within the hydrocarbon reservoir (100) that distinguish the locations of the different subsurface fluids. The gas water contact (GWC) (116) is the location or "surface", in the hydrocarbon reservoir (100), above which predominantly the gas phase (102) occurs and below which predominately the free water phase (104) occurs. The gas phase (102) and the free water phase (104) are miscible, so the GWC (116) is not necessarily sharp, and a transition zone (118) exists between the gas phase (102) and the free water phase (104), as shown in FIG. 1. The free water level (FWL) (120) is located near the base of the transition zone (118) and is a location or "surface" below which ~100% of the free water phase (104) occurs.

The gas oil contact (GOC) (122) is the location or "surface", in the hydrocarbon reservoir (100), above which predominantly the gas phase (102) occurs and below which predominately the oil phase (106) occurs. The oil water contact (OWC) (124) is the location or "surface", in the hydrocarbon reservoir (100), above which predominantly the oil phase (106) occurs and below which predominately the free water phase (104) occurs. In some embodiments of a hydrocarbon reservoir (100), the free water phase (104) enters the reservoir formation (110) from a formation, like a sandstone, located below the reservoir formation (110).

Exploratory wells (114a-c) may be drilled into a gas reservoir (100), as depicted in FIG. 1, to gather more data about the reservoir (100). These wells (114a-c) may encounter the free water phase (104), the gas phase (102), or both the free water phase (104) and the gas phase (102). When a well (114a) is drilled into a reservoir (100) and only the free water phase (104) is encountered, the well (114a) may be called a WUT (water up to) well (114a). When a well (114b) is drilled into the reservoir (100) and only the gas phase (102) is encountered, the well (114b) may be called a GDT (gas down to) well (114b). In cases where the well (114c) encounters the free water phase (104) and the gas phase (102), data gathered from the well (114c) may be used to determine the GWC (116). The data gathered from the WUT wells (114a), GDT wells (114b), and the GWC (116) wells (114c) may be used to help produce a difference map. A difference map maps the GWC (116) surface throughout the reservoir (100). This allows for indication of the "top pay zone" which is the primary zone where the gas phase (102) is located. An accurate location of the top pay zone helps in development of the reservoir (100) because production wells (114a-c) may be designed to target the hydrocarbon producing zone rather than the water producing zones.

Embodiments disclosed herein present a method that may be used to produce reliable and accurate subsurface difference maps that model and condition the free water phase (104) distribution in a reservoir (100). Herein, the reservoir (100) may be similar to the reservoir (100) depicted in FIG. 1 or the reservoir (100) may be a gas reservoir (100) having only a free water phase (104) and a gas phase (102).

Figure 2B:
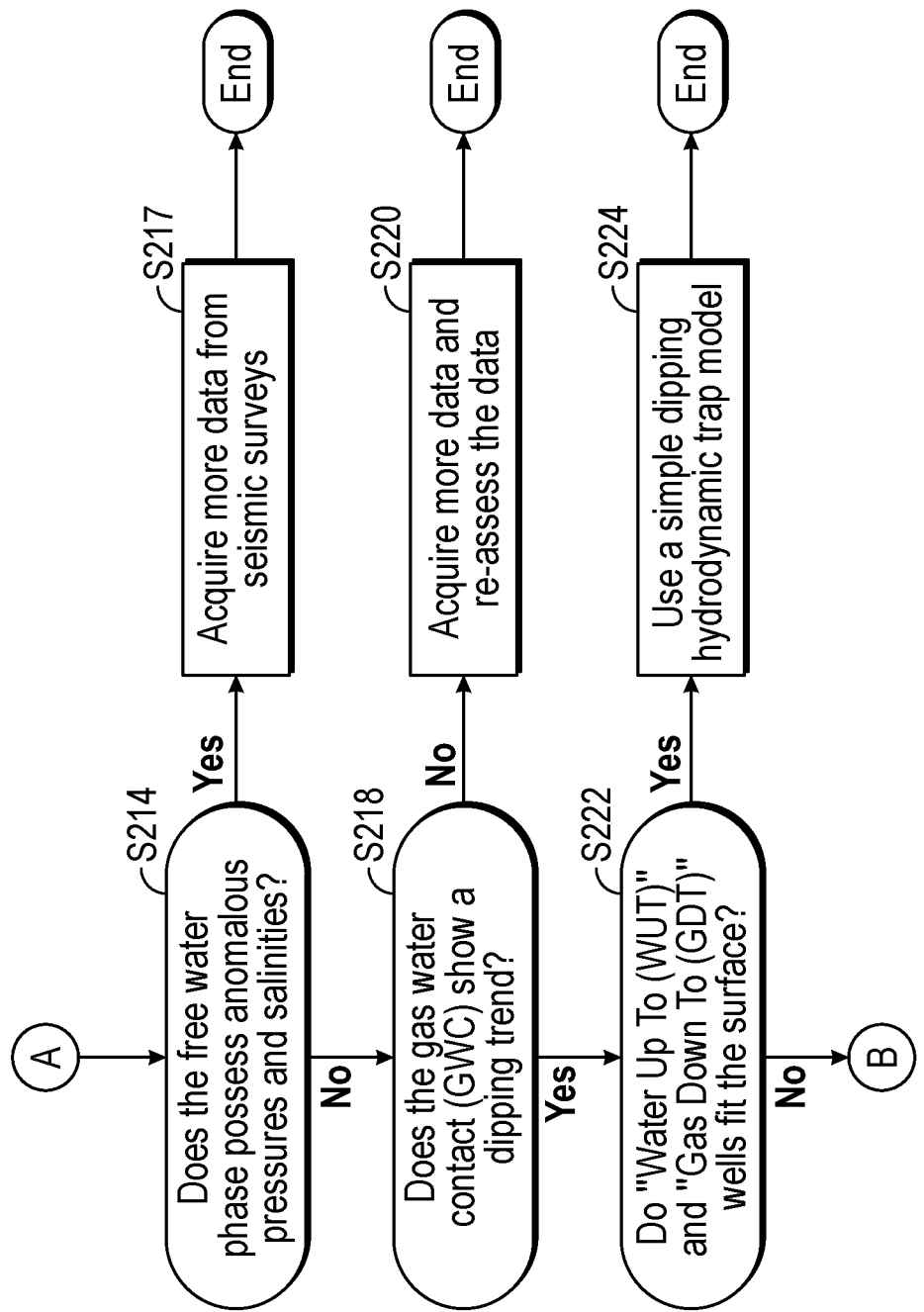
Figure 2C:
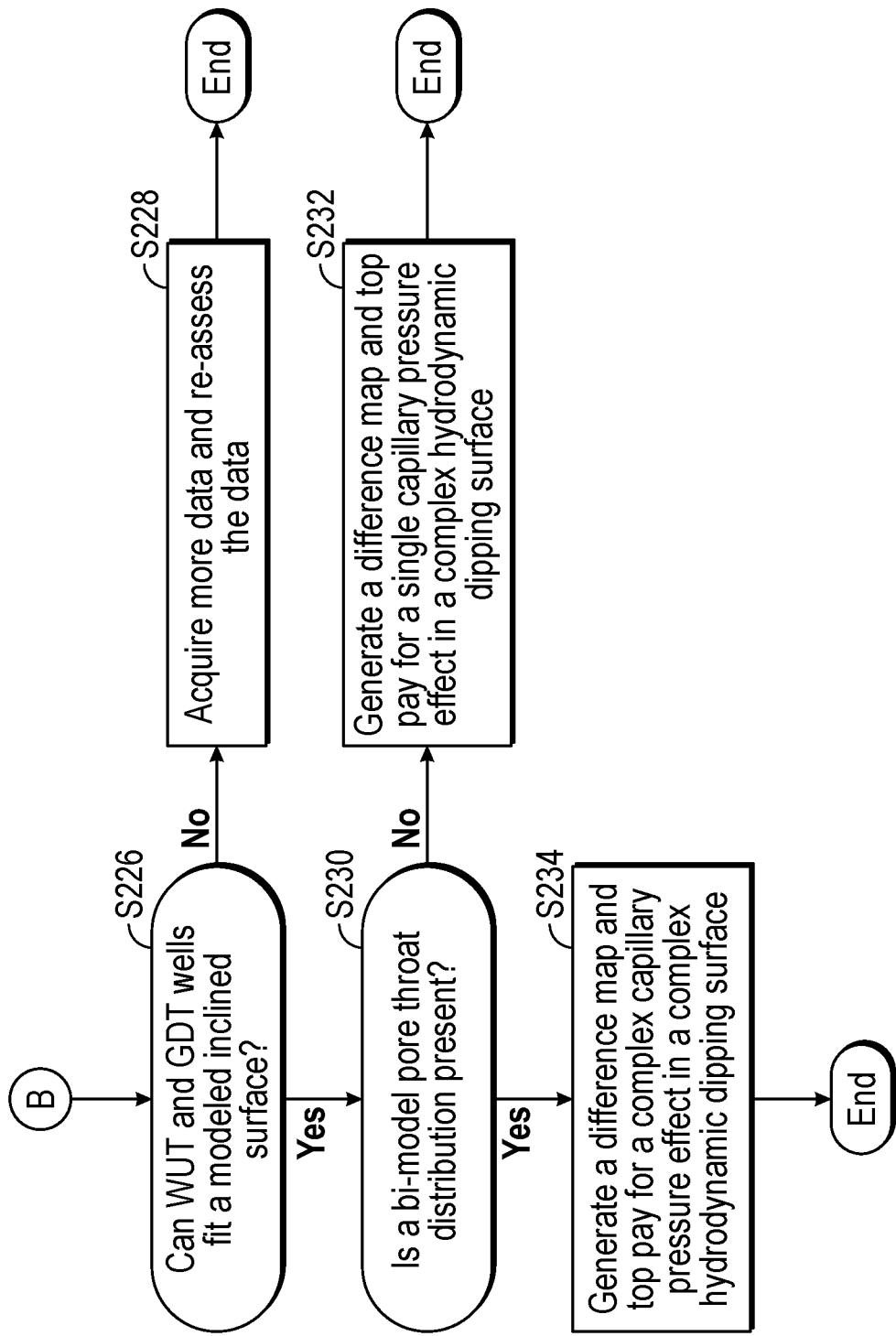

FIGS. 2a-2c depict flowcharts in accordance with one or more embodiments. More specifically, FIGS. 2a-2c illustrate the method for producing subsurface difference maps that model and condition the free water phase (104) distribution in a reservoir (100). While the various blocks in FIGS. 2a-2c are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively. FIGS. 3a-8 support and explain the various steps presented in FIGS. 2a-2c.

In FIG. 2a the initial question posed (or determination made) is "Does the reservoir (100) have an observable free water level (FWL) (120)?" (S200). To determine if the FWL (120) is observable, the capillary pressures within the reservoir (100) are integrated with a height function and interpreted with a log analysis. If the FWL (120) is deemed observable, the reservoir (100) may be analyzed further by progressing to S202.

If the FWL (120) is not observable, the reservoir (100) may no longer be analyzed using the disclosed method, and the process ends. There are methods to predict the FWL (120), when the FWL (120) is not observable, by analyzing various tools such as a modular dynamics tester tool, a reservoir dynamics tester tool, and an express pressure tool. However, in order for the most accurate subsurface difference maps to be produced by the method outlined in this disclosure, the FWL (120) must be observable, not predicted. Conventional hydrocarbon reservoirs (100) with high porosity are most likely to have an observable FWL (120) whereas tight reservoirs (100) are most likely to not have an observable FWL (120).

Figure 3A:
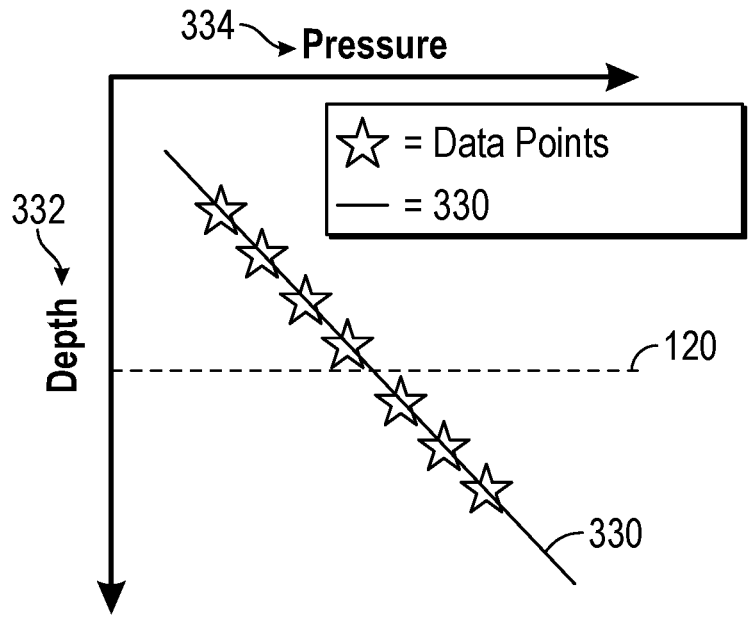
FIGS. 3a-3b show a constant pressure trend and a differing pressure trend in a reservoir.
Figure 3B:
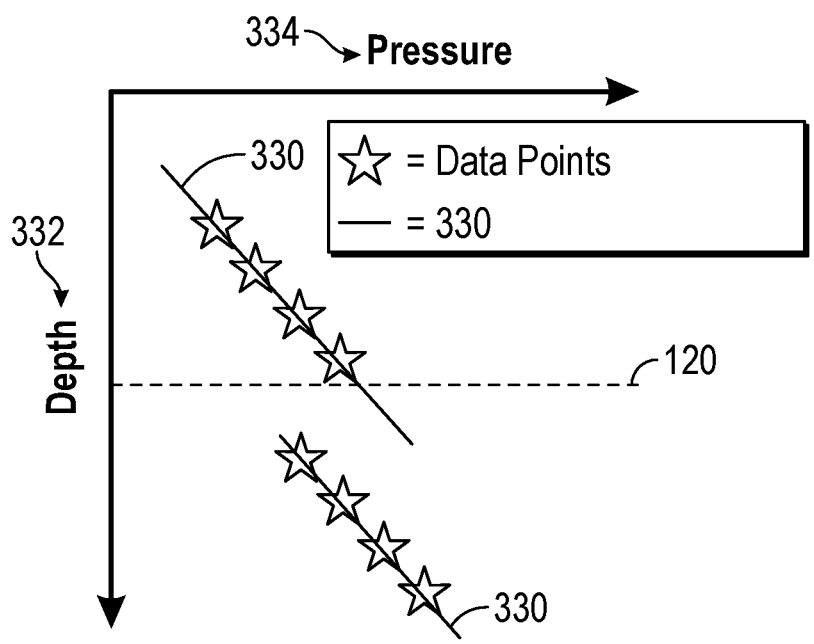

Returning to S200, when the FWL (120) is deemed observable, the reservoir (100) may be further analyzed by determining whether the pressure trend (330) of the free water phase (104) follows the same pressure trend (330) as the water in the rest of the reservoir (100) (S202). In connection with this determination, FIGS. 3a and 3b are graphs of depth (332) vs pressure (334). Pressure (334) data gathered during drilling a well (114a-c) is plotted at the depth (332) the pressure (334) data was obtained. The depth (332) in the reservoir (100) at which the FWL (120) occurs is represented by a dashed line. FIG. 3a depicts a reservoir (100) having a continuous pressure trend (330) within the water interval beneath the FWL (120).

FIG. 3b depicts a reservoir (100) having a discontinuous pressure trend (330) within the water interval below the FWL (120) (i.e., shifted relative to each other) by more than 150 psi. If the pressure trend (330) is continuous throughout the reservoir (100), as shown in FIG. 3a, then the reservoir (100) is in geological time equilibrium and a geological time equilibrium difference map, commonly known to a person of ordinary skill in the art, may be used to model the free water phase (104) distribution (S204), and the process ends. If the pressure trend (330) is not continuous throughout the reservoir (100), as shown in FIG. 3b, then the reservoir (100) may be analyzed further by progressing to S206.

Figure 4A:
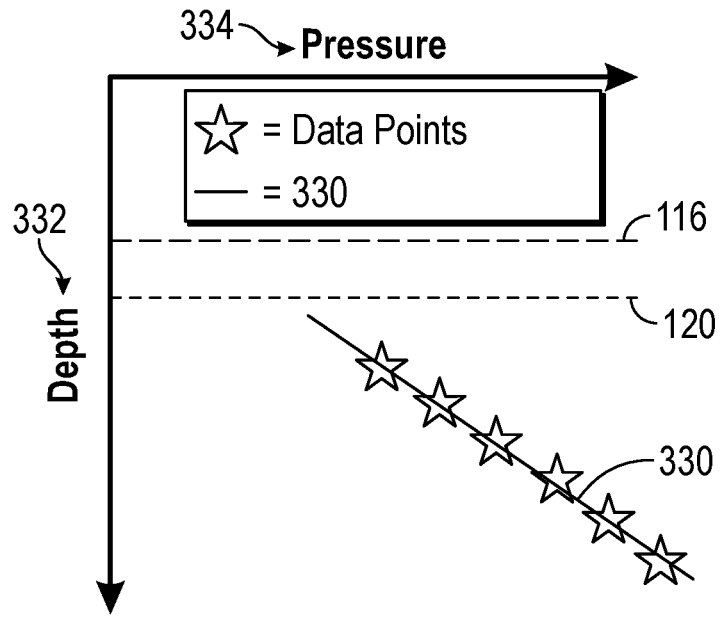
FIGS. 4a-4b show a pro-graditional pressure trend and a non-pro-graditional pressure trend in a reservoir.
Figure 4B:
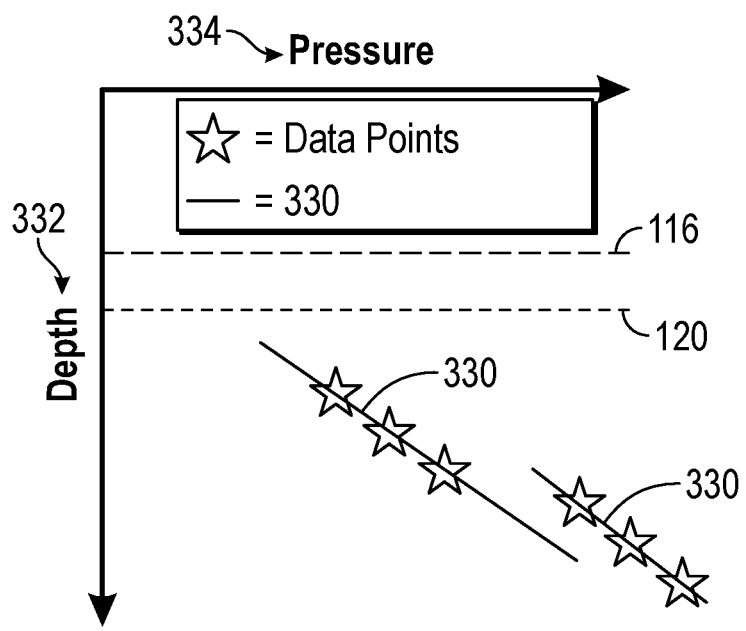

Continuing with FIG. 2A, when the pressure trend (330) of the reservoir (100) is deemed not continuous/not in geological time equilibrium, the reservoir (100) may be further analyzed by determining whether the pressure trend (330) of the free water phase (104) follows a pro-graditional pattern (S206). In connection with this determination, FIGS. 4a and 4b are graphs of depth (332) vs pressure (334). Pressure (334) data gathered during drilling a well (114a-c) is plotted at the depth (332) the pressure (334) data was obtained. The depth (332) in the reservoir (100) at which the GWC (116) and the FWL (120) occur are represented by dashed lines. FIG. 4a depicts a reservoir (100) having a pro-graditional pattern beneath the FWL (120), meaning that the pressure (334) data gathered at depths (332) deeper than the FWL (120) (and the corresponding pressure trend (330)) follow a continuous pattern.

FIG. 4b depicts a reservoir (100) not having a pro-graditional pattern beneath the FWL (120), meaning that the pressure (334) data gathered at depths (332) deeper than the FWL (120) (and the corresponding pressure trend (330)) do not follow a continuous pattern and there may be multiple different pressure trends (330) occurring beneath the FWL (120). If the reservoir (100) follows a pro-graditional pressure trend (330) below the FWL (120) then the reservoir (100) may be analyzed further by progressing to S210. If the reservoir (100) does not follow a pro-graditional pressure trend (330) below the FWL (120), then there may be a lateral/vertical structural/stratigraphic barrier that causes the pressure (334) to be compartmentalized. In this case, a pressure (334) compartmentalization difference map, commonly known to a person of ordinary skill in the art, may be used to model the free water phase (104) distribution (S208), and the process ends.

Figure 5A:
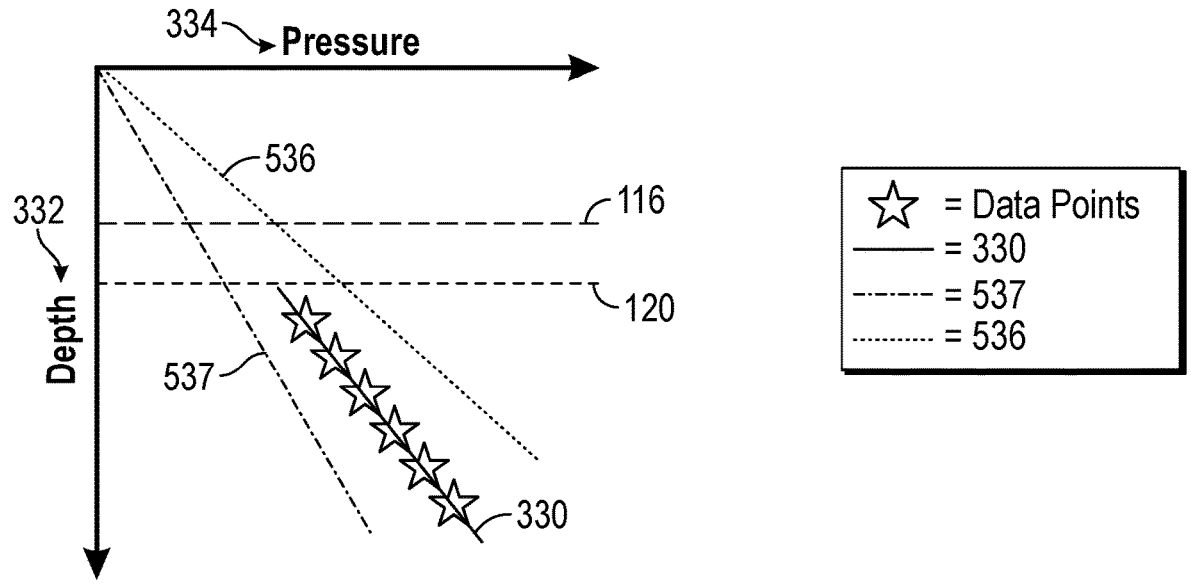
FIGS. 5a-5b show a pressure trend following a hydrostatic pressure trend and a pressure trend not following the hydrostatic pressure trend in a reservoir.
Figure 5B:
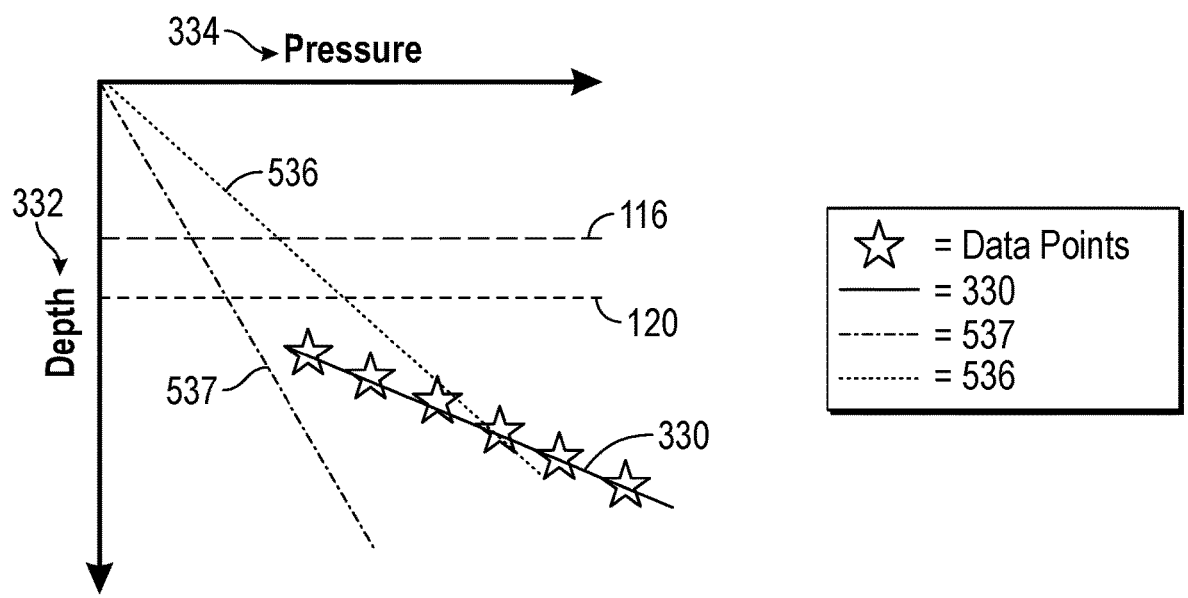

When the pressure trend (330) of the reservoir (100) does have pro-graditional pattern beneath the FWL (120), the reservoir (100) may be further analyzed by determining whether the pressure (334) of the free water phase (104) follows a hydrostatic pressure trend (S210). In connection with this determination, FIGS. 5a and 5b are graphs of depth (332) vs pressure (334). Pressure (334) data gathered during drilling a well (114a-c) is plotted at the depth (332) the pressure (334) data was obtained. The depth (332) in the reservoir (100) at which the GWC (116) and the FWL (120) occur are represented by dashed lines. The brine hydrostatic pressure trend (536) and freshwater hydrostatic pressure trend (537) is also shown on FIGS. 5a and 5b. The hydrostatic pressure trends (536 and 537) are what the pressure (334) of the reservoir (100) should be at particular depths (332) based off of the hydrostatic pressure equation, commonly known to a person of ordinary skill in the art, hydrostatic pressure is equal to (=) fluid density multiplied by gravity multiplied by fluid depth.

FIG. 5a depicts the pressure trend (330) of the free water phase (104) in a reservoir (100) following the hydrostatic pressure trends (536 and 537) For the purposes of this disclosure, the determination if the reservoir (100) in question does follow the hydrostatic pressure trend (536 and 537) is based on a range of hydrostatic pressure trends (536 and 537) starting with the freshwater hydrostatic pressure trend (537) and ending with the brine hydrostatic pressure trend (536), as depicted in FIG. 5a. As long as the free water phase (104) pressure trend (330) of the reservoir (100) in question lies within the aforementioned range, then the reservoir (100) is considered to follow the hydrostatic pressure trend (536 and 537). Thus, the free water phase (104) in the reservoir (100) may be categorized as "gravitational water", and the reservoir (100) may be further analyzed by progressing to S214, and the flowchart depicted in FIG. 2B. If the free water phase (104) pressure trend (330) of the reservoir (100) lies outside of the aforementioned range, as depicted in FIG. 5b, then the reservoir (100) is considered to not follow the hydrostatic pressure trend (536 and 537) and the reservoir (100) may be further analyzed by progressing to S212.

In Step S212 a determination is made as to whether the age of the free water phase (104) is dated to the latest extensive diagenetic process (S212). The age of the free water phase (104) is determined by dating a sample of the free water phase (104) using carbon-14 or argon dating. If the age of the free water phase (104) does share a date with the latest extensive diagenetic process, then the free water phase (104) in the reservoir (100) may be categorized as fossil water. In this case, the free water phase (104) distribution may be modeled using a fossil water diagenetic trap difference map (S216), commonly known to one of ordinary skill in the art, and the process ends. If the age of the free water phase (104) does not share a date with the latest extensive diagenetic process, then the free water phase (104) in the reservoir (100) is categorized as compactional water and the reservoir (100) may be further analyzed by progressing to S214 shown in FIG. 2B.

Figure 6:
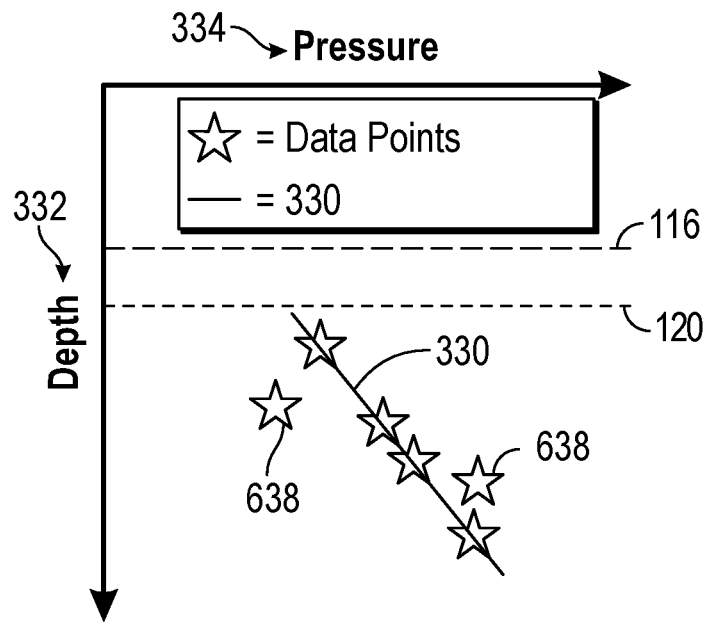
FIG. 6 shows anomalous pressure points in a reservoir.

When the pressure trend (330) of the free water phase (104) in the reservoir (100) follows the hydrostatic pressure trend (536) (or does not follow the hydrostatic pressure trend (536) and does not have a free water phase (104) dating to the latest extensive diagenetic process) the reservoir (100) may be further analyzed by determining whether the free water phase (104) possesses anomalous pressures (638) and salinities (S214). In connection with this determination, FIG. 6 depicts a graph of depth (332) vs pressure (334). Pressure (334) data gathered during drilling a well (114a-c) is plotted at the depth (332) the pressure (334) data was obtained. The depth (332) in the reservoir (100) at which the GWC (116) and the FWL (120) occur are represented by dashed lines.

FIG. 6 depicts a reservoir (100) having anomalous pressures (638) in the free water phase (104). Normal pressures (638) may range from 0.3-0.4 psi/ft and a pressure of 0.6 psi/ft would be an anomalous pressure (638). In the case of the reservoir (100) depicted in FIG. 6, the free water phase (104) may be categorized as perched water. The free water phase (104) may also be considered perched water when anomalous salinities are detected. Anomalous salinities are salinities that are at least a one order difference from the baseline signature. For example, if the baseline is 35K ppm then a value of 100K ppm would be considered anomalous. When the free water phase (104) is deemed to be perched water, more data needs to be acquired from seismic surveys (S217) and the workflow ends. If the reservoir (100) does not have anomalous pressures (638) or salinities in the free water phase (104), then the reservoir (100) may be further analyzed by progressing to S218.

Figure 7:
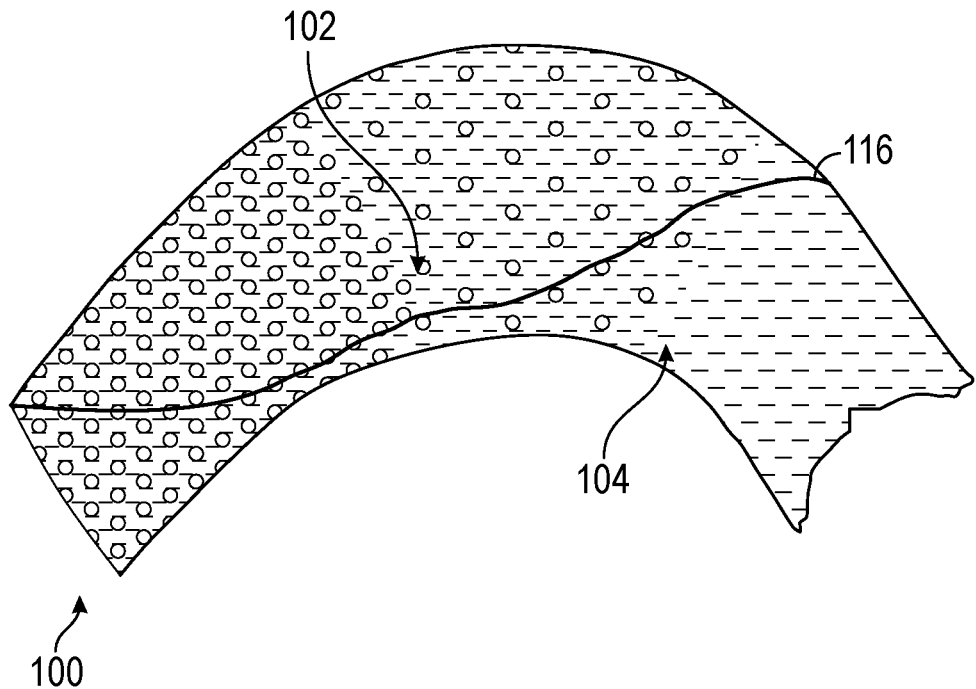
FIG. 7 shows a dipping gas water contact in a reservoir.

When the free water phase (104) of the reservoir (100) does not contain anomalous pressures (638) or salinities, the reservoir (100) may be further analyzed by determining whether the gas water contact (GWC) (116) surface shows any dipping trend. In connection with this determination, FIG. 7 depicts a reservoir (100) with a GWC (116) surface having a dipping trend, meaning the GWC (116) surface dips in one or more directions in the three-dimensional space. A dipping trend may be determined by mapping the observed GWCs (116) obtained from various wells (114c) drilled into the reservoir (100) at different locations. The dipping trend may be around 0.2 to 10 degrees. If the overall GWC (116) surface of the reservoir (100) shows a dipping trend, such as the reservoir (100) depicted in FIG. 7, then the reservoir (100) may be further analyzed by progressing to S222. If the GWC (116) surface of the reservoir (100) does not show a dipping trend, then more data needs to be acquired and the data re-assessed (S220), resulting in the end of the process at this stage. However, if a reservoir (100) has continued to this point in the method, the GWC (116) surface should show a dipping trend.

The reservoir may be further analyzed by determining whether WUT wells (114a) and GDT wells (114b) fit the GWC (116) surface. For example, after the GWC (116) surface has been mapped using GWC (116) data from wells (114c), a WUT well (114a) may be compared to the GWC (116) surface. The data from the WUT well (114a) may not match the GWC (116) surface meaning that the WUT well (114a) may show the free water phase (104) existing above the GWC (116) surface where only the gas phase (102) should exist. In this scenario, the WUT well (114a) does not fit the GWC (116) surface. If the WUT (114a) and GDT (114b) wells do fit the surface, then the free water phase (104) distribution may be modeled by a simple dipping hydrodynamic trap difference map (S224), and the process ends. If the WUT (114a) and GDT (114b) wells do not fit the surface, then the reservoir (100) may be analyzed further by progressing to S226, in FIG. 2C.

As described in FIG. 2C, S226 involves modeling an inclined surface to fit the data points of the reservoir (100), such as pressure (334) data, age data, and high-resolution seismic data. Further, the GWC (116) surface may be guided and adjusted to match the free water phase (104) and gas phase (102) locations derived from the WUT wells (114a) and GDT wells (114b). The flowchart further requires determining again if the WUT (114a) and GDT (114b) wells fit the modeled inclined surface. If the WUT (114a) and GDT (114b) wells fit the modeled inclined surface, the reservoir (100) may be further analyzed by progressing to S230. If the WUT (114a) and GDT (114b) wells do not fit the modeled inclined surface, then more data needs to be acquired and the data re-assessed (S228), and the process ends. However, at this stage of the process, the WUT (114a) and GDT (114b) wells should fit the modeled inclined surface.

Figure 8:
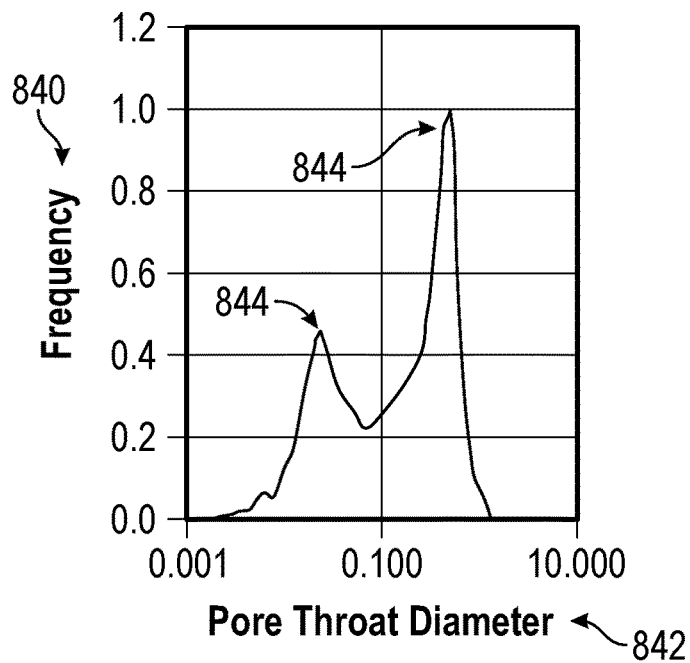
FIG. 8 shows a bi-model pore throat distribution in a reservoir.

When the WUT (114a) and GDT (114b) wells fit the modeled inclined surface, the reservoir (100) may be further analyzed by determining whether a bi-model pore throat distribution is present (S230). In connection with this determination, FIG. 8 depicts a bi-model pore throat distribution. A bi-model distribution is categorized by the two distinct peaks (844) that occur when the frequency (840) of a pore throat diameter (842) is graphed against the pore throat diameters (842). The frequency of various pore throat diameters (842) may be determined by running a mercury injection capillary pressure test on various reservoir (100) samples.

When a reservoir (100) has data that produces a bi-model pore throat distribution, as shown in FIG. 8, then the reservoir (100) has a complex capillary pressure effect. Thus, a difference map and top pay zone for a complex hydrodynamic dipping surface may be created to model the free water phase (104) distribution (S234). When a reservoir (100) does not have data that produces a bi-model pore throat distribution, then the reservoir (100) has a simple capillary pressure effect. Thus, a difference map and top pay zone for a simple hydrodynamic dipping surface may be created to model the free water phase (104) distribution (S232).

Figure 9:
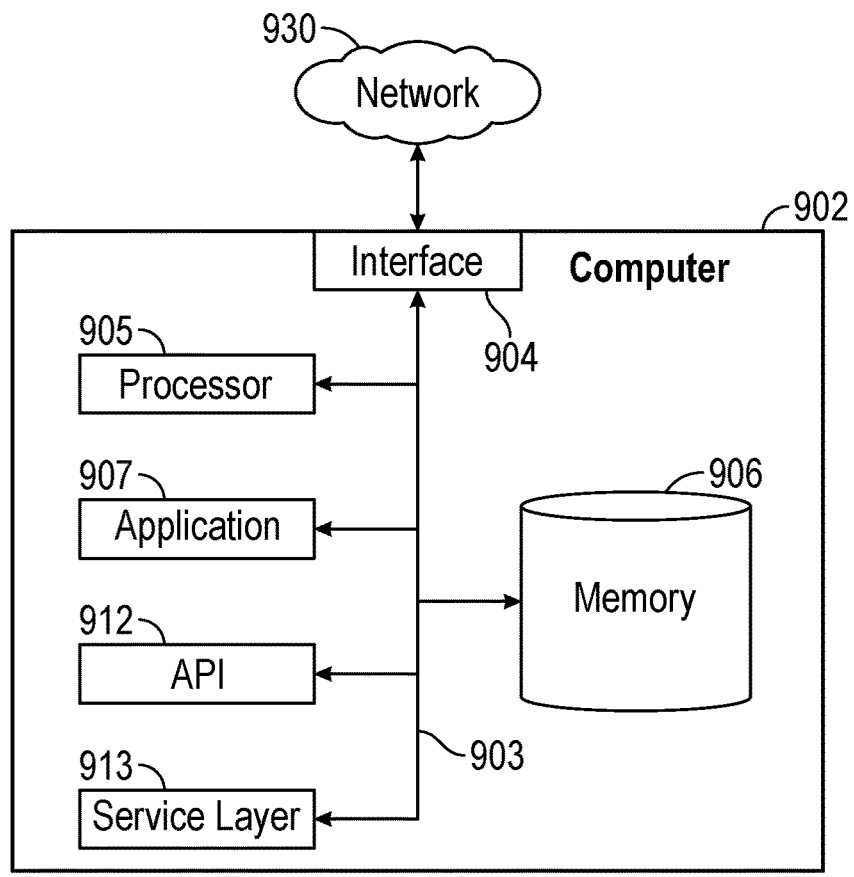
FIG. 9 shows a computer system in accordance with one or more embodiments.

A non-transitory computer readable medium may store instructions for modeling the free water phase (104) distribution in a reservoir (100). The instructions have functionality for progressing a reservoir (100) through the aforementioned methodology steps in order to model the free water phase (104) distribution in a reservoir (100). Embodiments may be implemented on a computer system (902). FIG. 9 is a block diagram of a computer system (902) used to provide computational functionalities associated with described algorithms, methods, functions, processes, flows, and procedures as described in the instant disclosure, according to an implementation. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902).

The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or other suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904 includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method for modeling water distribution in a reservoir having a gas phase, a free water phase, and a plurality of pores, the method comprising:
   determining a free water level in the reservoir;
   analyzing a free water pressure trend of the free water phase;
   determining a presence of anomalous pressures and salinities within the free water phase;
   determining whether gas down to models and water up to models fit the reservoir;
   determining a bi-modal pore throat distribution of the plurality of pores within the reservoir;
   generating a difference map to model the water distribution in the reservoir;
   determining a top pay zone of the reservoir using the difference map, wherein the top pay zone is a portion of the reservoir where the gas phase is located; and
   drilling a well into the top pay zone of the reservoir to produce gas using the well.

2. The method of claim 1,
   wherein the difference map models the top pay zone for a complex capillary pressure effect in a complex hydrodynamic dipping surface.

3. The method of claim 1,
   wherein the difference map models the top pay zone for a single capillary pressure effect in a complex hydrodynamic dipping surface.

4. The method of claim 1,
   wherein the free water pressure trend is analyzed by comparing the free water pressure trend to a reservoir pressure trend.

5. The method of claim 4,
wherein the free water pressure trend is analyzed by comparing the free water pressure trend to a prograditional pattern.

6. The method of claim 5,
wherein the free water pressure trend is analyzed by comparing the free water pressure trend to a hydrostatic pressure trend.

7. The method of claim 6, further comprising:
determining an age of the free water phase.

8. The method of claim 7, further comprising:
determining whether the age of the free water phase is dated to a most recent extensive diagenetic process.

9. The method of claim 8, further comprising:
determining if a gas water contact shows a dipping trend wherein the gas water contact is a location in the reservoir located where the free water phase meets the gas phase.

10. The method of claim 9, further comprising:
creating an adjusted inclined gas water contact to fit the gas down to models and the water up to models.

11. A non-transitory computer readable medium storing instructions for modeling water distribution in a reservoir having a gas phase, a free water phase, and a plurality of pores executable by a computer processor, the instructions comprising functionality for:
determining a free water level in the reservoir;
analyzing a free water pressure trend of the free water phase;
determining a presence of anomalous pressures and salinities within the free water phase;
determining whether gas down to models and water up to models fit the reservoir;
determining a bi-modal pore throat distribution of the plurality of pores within the reservoir;
generating a difference map to model the water distribution in the reservoir.

12. The non-transitory computer readable medium of claim 11,
wherein the free water pressure trend is analyzed by comparing the free water pressure trend to a reservoir pressure trend.

13. The non-transitory computer readable medium of claim 12,
wherein the free water pressure trend is analyzed by comparing the free water pressure trend to a prograditional pattern.

14. The non-transitory computer readable medium of claim 13,
wherein the free water pressure trend is analyzed by comparing the free water pressure trend to a hydrostatic pressure trend.

15. The non-transitory computer readable medium of claim 14, wherein the instructions further comprise functionality for:
determining an age of the free water phase.

16. The non-transitory computer readable medium of claim 15, wherein the instructions further comprise functionality for:
determining whether the age of the free water phase is dated to a most recent extensive diagenetic process.

17. The non-transitory computer readable medium of claim 16, wherein the instructions further comprise functionality for:
determining if a gas water contact shows a dipping trend wherein the gas water contact is a location in the reservoir located where the free water phase meets the gas phase.

18. The non-transitory computer readable medium of claim 17, wherein the instructions further comprise functionality for:
creating an adjusted inclined gas water contact to fit the gas down to models and the water up to models.

19. The non-transitory computer readable medium of claim 18,
wherein the difference map models a top pay zone for a complex capillary pressure effect in a complex hydrodynamic dipping surface.

20. The non-transitory computer readable medium of claim 18,
wherein the difference map models a top pay zone for a single capillary pressure effect in a complex hydrodynamic dipping surface.

* * * * *